April 15, 1958 — D. L. JAFFE — 2,830,529
AUTOMATIC PANCAKE BAKER

Filed Nov. 16, 1954 — 2 Sheets-Sheet 1

INVENTOR.
D. LAWRENCE JAFFE
BY Darby & Darby
ATTORNEYS

April 15, 1958

D. L. JAFFE 2,830,529

AUTOMATIC PANCAKE BAKER

Filed Nov. 16, 1954

INVENTOR.
D. LAWRENCE JAFFE
BY Darby & Darby
ATTORNEYS

United States Patent Office 2,830,529
Patented Apr. 15, 1958

2,830,529

AUTOMATIC PANCAKE BAKER

David Lawrence Jaffe, Great Neck, N. Y., assignor to Polarad Electronics Corporation, Brooklyn, N. Y., a corporation of New York Application November 16, 1954, Serial No. 469,138

4 Claims. (Cl. 99—423)

The present invention relates to a pancake baking machine and particularly to such a machine provided with means for automatically depositing batter on a griddle, baking the batter first on one side and then on the other, and discharging the completely baked pancake from the machine.

It is an object of the invention to provide a machine for automatically forming completely baked pancakes from batter stored in a hopper.

It is another object of the invention to provide such a machine which is provided with two griddle elements operating upon the two sides of a pancake to bake it, such operation being in timed sequence and properly coordinated with the discharge of the completed pancake from the machine as well as with the deposition of a new batter portion on the first griddle.

It is another object of the invention to provide such a pancake baking machine having electrically heated griddles which griddles have circuit controllers making it possible to adjust the heat of the griddle elements individually to assure the proper baking of each side of the pancake.

It is a further object of the invention to provide such a pancake baking machine which is simple in construction and consequently inexpensively manufactured and readily maintained in service.

Other objects and features of the invention will be apparent when the following description is considered in connection with the annexed drawings, in which, Figure 1 is a front elevation of the machine of this invention, a portion of one of the housings thereof being broken away in order to show the internal construction particularly of the operating mechanism;

Figure 1:
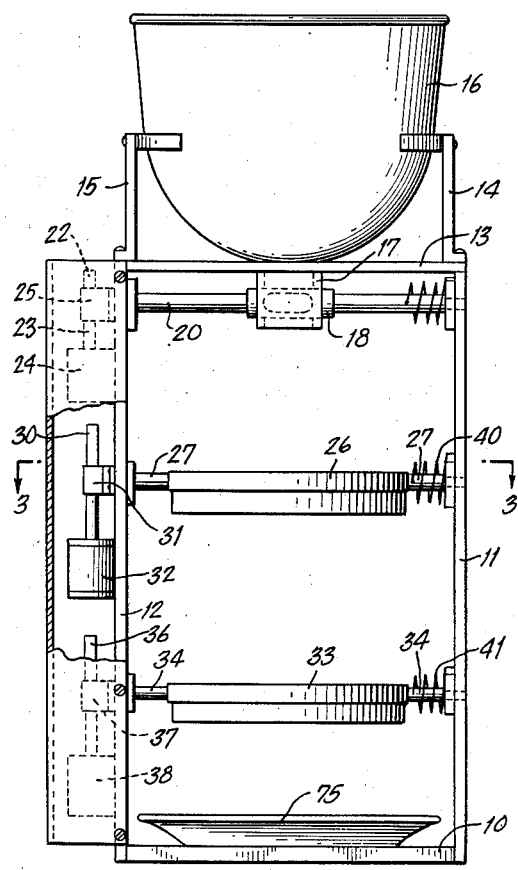
Figure 2:
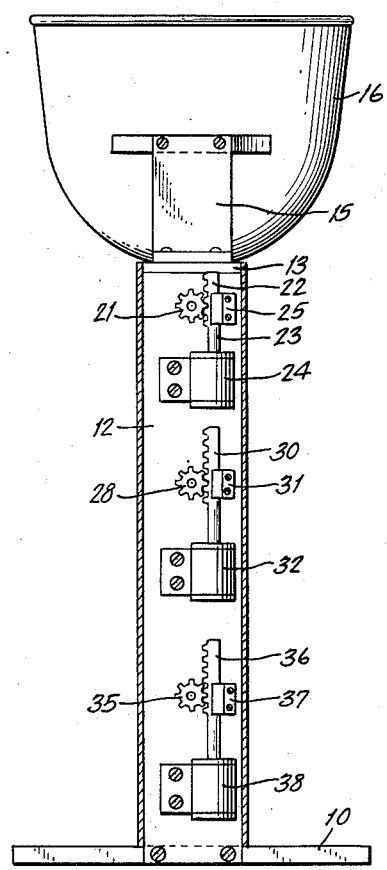
Figure 2 is a side elevation of the device of Figure 1, the coverplate being removed to show the relationship of certain solenoid operators.
Figure 3:
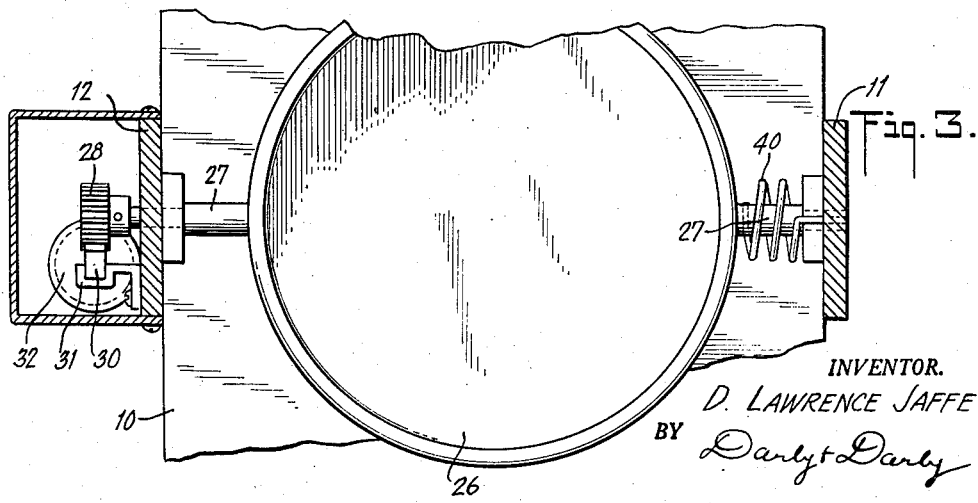
Figure 3 is a horizontal cross-sectional view illustrating particularly the rack and pinion drive for one of the griddles as well as the shape and construction of the griddle proper.

Referring now to the drawings and particularly to Figures 1 through 3, the machine comprises a base 10 which may be of any desirable shape being shown in the present instance as substantially square. Fixed to the base at either side thereof are the frame members 11 and 12 which extend upwardly and are joined at their top by the horizontal frame member 13. Supported at the top of the structure from the member 13 through the medium of the brackets 14 and 15 is a container or hopper 16 in which a suitable batter is placed.

The hopper 16 terminates at its lower edge in a chute 17 in which a rotary valve 18 is positioned, the valve 18 being mounted on a shaft 20 and supported for rotation in suitable bearings (not shown) in the side members 11 and 12. Mounted at the left end on shaft 20 is a pin 21 which meshes with a rack section 22 fixed to the core 23 of a solenoid 24. The solenoid 24 is fastened by any suitable means to the left hand frame member 12. Rack 22 is guided for vertical reciprocatory movement by means of a guide bracket 25 fixed to the frame member 12.

Mounted beneath the hopper 16 and in a position to receive batter discharged through the rotary valve 18 is a griddle 26 which griddle is provided with shaft portions 27 extending outwardly therefrom at opposite ends of a diameter thereof. The shafts 27 are supported in suitable bearings in the frame members 11 and 12, the left hand shaft portion 27 being provided with a pin 28 meshing with a rack 30 guided for reciprocatory movement by a guide 31 and operated by a solenoid 32 fixed to the frame member 12.

Mounted beneath the griddle 26 is a second griddle 33 having shaft portions 34 exactly similar to the shaft portions 27 and mounted in the frame members 11 and 12 in a similar manner. The second griddle 33 is, like the first griddle, rotatable through 180° by means of a pinion 35 mounted on shaft 34 and in mesh with a rack 36, guided by a guide member 37 and operated by solenoid 38.

Griddles 26 and 33 are restored to their normal position by means of springs 40 and 41 respectively, these springs being coiled about the right hand shaft portions 27 and 34.

Figures 4, 5:
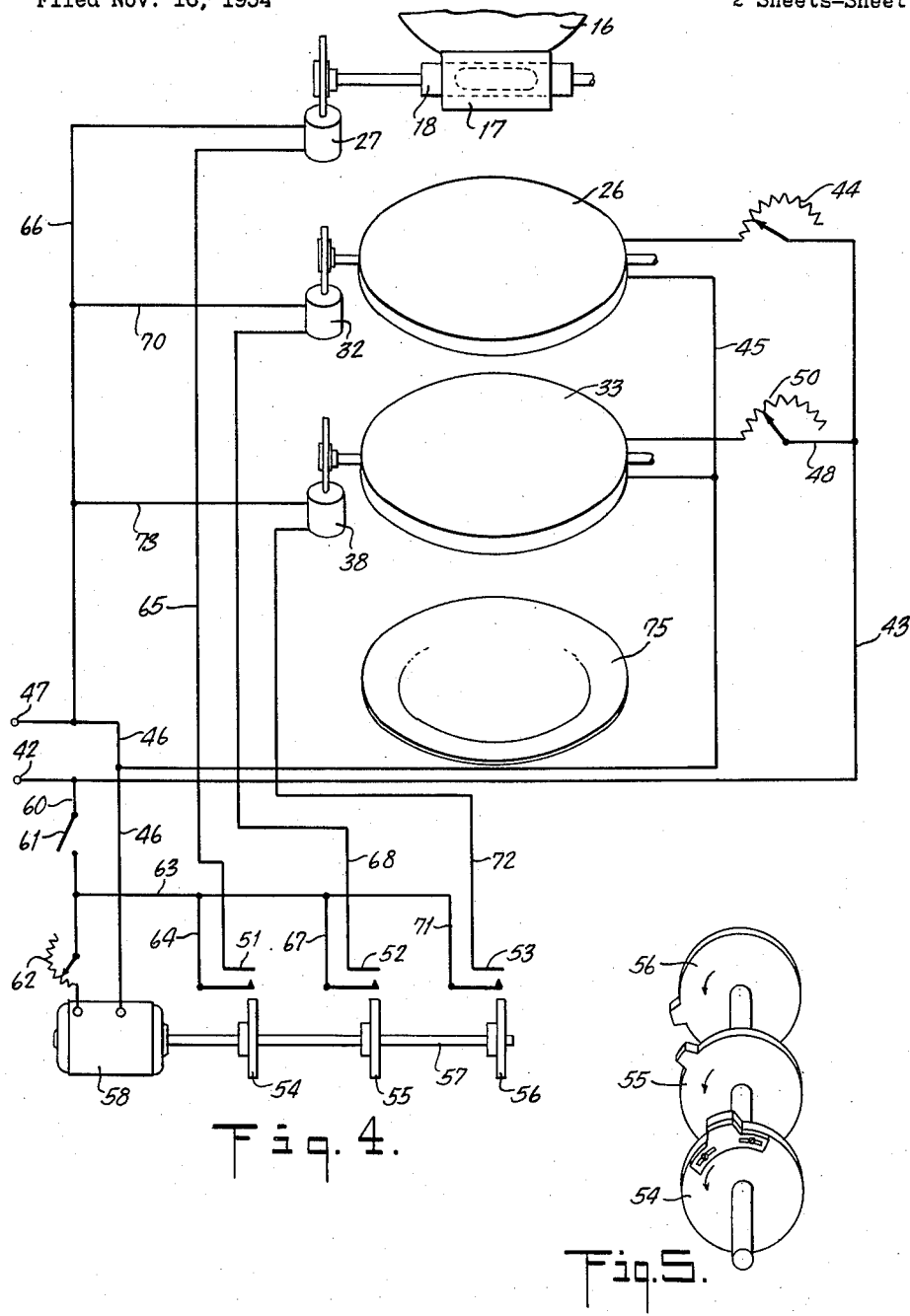
Figure 4 is a schematic wiring diagram of the pancake baker of the preceding figures.
Figure 5 is an enlarged perspective view of the cams which control the completion of the various circuits to operate the machine elements in timed sequence.

The griddles 26 and 33 are electrically heated. Referring now to Figure 4, the heating circuit for the griddle 26 is from one terminal 42 of a source of electrical current over conductor 43, through rheostat 44, the heating element of griddle 26, and thence over conductors 45 and 46 to the other terminal 47 of the source. The similar heating circuit for griddle 33 extends from terminal 42 over conductors 43 and 48 through rheostat 50, the heating element of griddle 33 and conductors 45 and 46 to the other terminal 47 of the source. Rheostats 44 and 50 serve to adjust the heat output of the griddles 26 and 33 so that the second side of one pancake will bake to a proper degree on griddle 33 in the same time that the first side of a pancake bakes on griddle 26.

The operation of the solenoids 24, 32 and 38 is controlled by contacts 51, 52 and 53 respectively. The opening and closing of the contacts 51, 52, 53 is controlled by the cams 54, 55 and 56 which cams are mounted upon the shaft 57 of a motor 58. The circuit for motor 58 extends from terminal 42 over conductor 43 through conductor 60, switch 61, rheostat 62 and thence through the motor windings and over conductor 46 to a terminal 47. Closure of contacts 51 associated with cam 54 completes a circuit from terminal 42 over conductor 60, switch 61, conductor 63, conductor 64, switch 51, conductor 65, winding of solenoid 27 and conductor 66 to conductor 46 and terminal 47. In like manner closure of contacts 52 completes a circuit from terminal 42 over conductors 60, switch 61, conductors 63 and 67, switch contacts 52, conductor 68, solenoid 32, conductors 70, 66, and 46 and to terminal 47.

The circuit for the third operating solenoid 38 extends from terminal 42 over conductor 60, switch 61, conductors 63 and 71, switch contacts 53, conductor 72, solenoid 33 and conductors 73, 66 and 46 to terminal 47.

Upon closure of switch 61 motor 58 is operated causing rotation in a counterclockwise direction of the cams 54, 55 and 56. As the cams rotate contacts 53 are first closed causing operation of solenoid 38 and rotation of griddle 33 through 180°. Contacts 53 are maintained closed during approximately 15° of rotation of the cam shaft 57 after which these contacts open and griddle 33 is restored to its normal position by means of the spring 41. Immediately after this restoration cam 55 causes closure of contacts 52 energizing solenoid 32 and causing griddle 26 to rotate through 180°. After approximately 15° of rotation of shaft 57 contacts 52 are again permitted to open deenergizing solenoid 32 and causing griddle 26 to be restored to the normal position shown through the action of spring 40.

Shortly after the restoration of griddle 26 to normal position cam 54 causes closure of contacts 51 energizing solenoid 27 and operating the valve 18 to cause the batter from the hopper 16 to pass through the chute 17 and valve 18 and be deposited on griddle 26.

Assuming that the machine had been out of operation and that the machine had just been placed in operation when the switch 61 was closed as described above, it will be clear that the batter deposited on griddle 26, as described immediately above, will form the first pancake of a new series of pancakes. This pancake is baked during the time which is required to rotate cam shaft 57 through approximately 330°. At this time, griddle 26 is rotated and the pancake baked on one side is turned and deposited on the griddle 33. Shortly thereafter griddle 26 is restored to its normal position, valve 18 is opened, and a new pancake is deposited on griddle 26. At the completion of the revolution of cam shaft 57 griddle 33 is operated and the first pancake now baked on both sides is turned and deposited on a plate 75 positioned upon the base 10. As soon as the pancake is discharged from griddle 33 and that griddle is restored to normal position, griddle 26 rotates to deposit the second pancake of the series upon griddle 33 and as soon as griddle 26 is returned to its normal position, valve 18 is opened to deposit batter for a third pancake upon the griddle 26. The pancakes continue to be baked in this sequential fashion until switch 61 is opened or the batter is exhausted.

The rheostat 62 is utilized in order to control the speed of rotation of motor 58 in order to allow the baking time on the griddles 26 and 33 to be simultaneously adjusted. In addition, as stated hereinabove, rheostats 44 and 50 are provided in order that the temperature of griddles 26 and 33 be adjusted relative to each other to assure that the baking of the pancake on its two sides is even.

While I have described a preferred embodiment of my invention it will be understood that many other modifications may be made without deviating from the principles thereof; therefore I wish to be limited not by the foregoing description, but solely by the claims granted to me.

What is claimed is:

1. A machine for forming and baking pancakes, comprising, in combination, a frame, a container for pancake batter mounted on said frame, valve means for controlling the flow of batter from said container, a first griddle mounted on said frame beneath said container and normally presenting its baking surface to the discharge from said valve means, said griddle being rotatable about its central horizontal axis to discharge batter baked on one side therefrom, a second griddle mounted on said frame beneath said first griddle and normally presenting its baking surface in the path of a pancake discharged from said first griddle, said second griddle being rotatable about its central horizontal axis to discharge a completed pancake therefrom, means for heating said first and second griddles, and timing means to cause said second griddle to discharge a completely baked pancake therefrom and return to normal position to then cause said first griddle to discharge a partially baked pancake therefrom onto said second griddle and return to normal position and to thereafter cause said valve means to operate to deposit a predetermined batter portion on said first griddle, said timing means comprising an electric motor and a cam shaft driven thereby, said valve and said griddles being electromechanically operated, said cams controlling contacts in the circuits of said electromechanical operators.

2. A device as claimed in claim 1, characterized in that means are provided to regulate the speed of said motor to thereby determine the length of time for a complete cycle of operation of said machine.

3. A device as claimed in claim 1, characterized in that at least one of said cams is provided with an adjustable segment whereby the duration of operation of said valve means may be varied.

4. A machine for forming and baking pancakes, comprising, in combination, a base, vertically extending frame members fixed to said base at opposite sides thereof, a hopper for batter supported on said frame members at the upper end thereof, a discharge opening in the base of said hopper, a valve located in said discharge opening and controlling the discharge of batter from said hopper, a first griddle rotatably mounted on its central horizontal axis in said upstanding frame members beneath said valve in position to receive said batter discharged from said hopper, a second griddle rotatably supported on its central horizontal axis in said upstanding frame members beneath and in vertical alignment with said first griddle and in position to receive a partially baked batter portion discharge from said first griddle by rotation thereof, said hopper valve being a rotary valve, the shaft of which is mounted in said upstanding frame members, said griddles being fixed each to a shaft rotatably mounted in said upstanding frame members, said valve and griddle shafts being provided with pinions, racks meshing with said pinions reciprocatingly mounted on one of said frame members, solenoids for actuating said racks and timing means comprising motor driven cams and electrical circuits having contacts controlled by said cams, said contacts being respectively in the circuit of the valve, first griddle and second griddle solenoids whereby said solenoids are operated in timed relationship to deposit batter on said first griddle, bake said batter on one side, discharge said partially baked batter from said first griddle to said second griddle, bake said batter portion on the remaining side and discharge the completed pancake onto a plate positioned on said base.

References Cited in the file of this patent

UNITED STATES PATENTS 1,844,339     Shaw _____ Feb. 9, 1932